US007823155B2

United States Patent
Misra et al.

(10) Patent No.: US 7,823,155 B2
(45) Date of Patent: Oct. 26, 2010

(54) OPTIMIZING NETWORK PERFORMANCE FOR A USE APPLICATION ON A MOBILE COMMUNICATION DEVICE BY AVERAGING A LEVEL OF PERFORMANCE OF THE USE APPLICATION FOR A PLURALITY OF MOBILE COMMUNICATION DEVICES

(75) Inventors: Rashmi Misra, Cheltenham (GB); Timothy Charity, Devizes (GB)

(73) Assignee: Motorola-Mobility, Inc., Libertyville, IL (US)

( * ) Notice: Subject to any disclaimer, the term of this patent is extended or adjusted under 35 U.S.C. 154(b) by 487 days.

(21) Appl. No.: 11/908,558

(22) PCT Filed: Apr. 14, 2006

(86) PCT No.: PCT/US2006/014277

§ 371 (c)(1),
(2), (4) Date: Sep. 13, 2007

(87) PCT Pub. No.: WO2006/124169

PCT Pub. Date: Nov. 23, 2006

(65) Prior Publication Data

US 2008/0139197 A1     Jun. 12, 2008

(30) Foreign Application Priority Data

May 12, 2005    (GB)    ................... 0509752.2

(51) Int. Cl.
| G06F 9/46 | (2006.01) |
|---|---|
| G06F 11/30 | (2006.01) |
| G06F 15/173 | (2006.01) |
| G06F 11/00 | (2006.01) |
| H04W 24/00 | (2009.01) |
| H04M 11/00 | (2006.01) |

(52) U.S. Cl. .................. 718/104; 709/223; 709/224; 709/225; 709/226; 370/252; 455/405; 455/408; 455/423; 455/425; 702/186

(58) Field of Classification Search .............. 718/100, 718/104; 709/223–226; 455/405, 408, 423, 455/425; 702/186; 370/224, 230, 252
See application file for complete search history.

(56) References Cited

U.S. PATENT DOCUMENTS 5,999,963 A * 12/1999 Bruno et al. ................. 718/104

(Continued)

FOREIGN PATENT DOCUMENTS

GB    2367721 A    4/2002

(Continued)

OTHER PUBLICATIONS

Harada et al, "Adaptive Resource Allocation Control With On-Line Search for Fair QOS Level", IEEE, 2004, pp. 1-8.*

(Continued)

*Primary Examiner*—Chat C Do
*Assistant Examiner*—Jennifer N To

(57) ABSTRACT

A system to optimize network performance for a use application provides a probe application that is provided by a network server for downloading by a mobile device. The probe application monitors a level of performance for various use applications provided by the network for the mobile device and reports the monitored level of performance for at least one of the use applications to the network server. The network server collates the performance data from the plurality of communication devices and provides resource allocation instructions to the mobile device to optimize a level of performance for the use applications for the communication device.

6 Claims, 3 Drawing Sheets

U.S. PATENT DOCUMENTS

| | | | |
|---|---|---|---|
| 6,745,011 B1* | 6/2004 | Hendrickson et al. | 455/67.11 |
| 6,754,470 B2* | 6/2004 | Hendrickson et al. | 455/67.11 |
| 6,907,243 B1* | 6/2005 | Patel | 455/442 |
| 7,043,237 B2* | 5/2006 | Snyder et al. | 455/425 |
| 7,103,350 B2* | 9/2006 | Au et al. | 455/412.2 |
| 7,151,938 B2* | 12/2006 | Weigand | 455/452.1 |
| 7,324,815 B2* | 1/2008 | Ross et al. | 455/425 |
| 2002/0069037 A1* | 6/2002 | Hendrickson et al. | 702/186 |
| 2002/0099818 A1* | 7/2002 | Russell et al. | 709/224 |
| 2002/0183084 A1* | 12/2002 | Wu et al. | 455/509 |
| 2003/0005112 A1* | 1/2003 | Krautkremer | 709/224 |
| 2003/0064730 A1* | 4/2003 | Chen et al. | 455/453 |
| 2003/0120764 A1* | 6/2003 | Laye et al. | 709/223 |
| 2003/0134631 A1* | 7/2003 | Snyder et al. | 455/423 |
| 2003/0232616 A1 | 12/2003 | Gidron et al. | |
| 2004/0014491 A1* | 1/2004 | Weigand | 455/552.1 |
| 2004/0058651 A1 | 3/2004 | Ross et al. | |
| 2004/0071084 A1* | 4/2004 | El-Hennawey et al. | 370/230 |
| 2004/0181550 A1 | 9/2004 | Warsta et al. | |
| 2005/0063389 A1* | 3/2005 | Elliott et al. | 370/395.4 |
| 2005/0130645 A1 | 6/2005 | Dobson et al. | |
| 2005/0138168 A1* | 6/2005 | Hoffman et al. | 709/224 |
| 2005/0190731 A1* | 9/2005 | Bejerano et al. | 370/338 |

FOREIGN PATENT DOCUMENTS

| | | | |
|---|---|---|---|
| GB | 2401283 A | 11/2004 | |
| JP | 2001252475 | 9/2001 | |
| WO | 2004004380 A1 | 1/2004 | |

OTHER PUBLICATIONS

Riz Mohammad, "Parent Application GB 050975.2—Combined Search and Examination Report," The Patent Office, Patents Directorate, Newport, South Wales, UK, Sep. 29, 2005, 5 pages, most relevant pp. 4-5.

An Meng-Al, "Corresponding Application PCT/US2006/014277—PCT International Search Report and Written Opinion," WIPO, ISA/US, Commissioner for Patents, Alexandria, VA, USA, Dec. 12, 2006, 8 pages, most relevant pp. 4, 7-8.

Agnes Wittmann-Regis, "Corresponding Application PCT/US2006/014277—International Preliminary Report on Patentability," The International Bureau of WIPO, Geneva, Switzerland, Nov. 22, 2007, 6 pages, most relevant pp. 5-6.

Japanese Examiner, "Notification of Resons for Rejection," Japanese Patent Office, Tokyo, Japan, Mar. 9, 2010, 9 pages, most relevant pp. 1-6.

Chinese Examiner, "Notification of First Office Action," The State Intellectual Property Office of the People's Republic of China, Beijing, China, Apr. 26, 2010, 9 Pages, most relevant pp. 1-5.

* cited by examiner

OPTIMIZING NETWORK PERFORMANCE FOR A USE APPLICATION ON A MOBILE COMMUNICATION DEVICE BY AVERAGING A LEVEL OF PERFORMANCE OF THE USE APPLICATION FOR A PLURALITY OF MOBILE COMMUNICATION DEVICES

FIELD OF THE INVENTION

The present invention relates generally to the field of communication systems, and more particularly, radiotelephone communication networks between servers and communication devices.

BACKGROUND OF THE INVENTION

The trend in wireless mobile radiotelephone communication devices is to provide more and more data services. These services can include web browsing, e-mail, downloading files, multi-media streaming, Voice Over Internet Protocol (VoIP) services, real-time gaming, and the like. These data services are in addition to the normal voice traffic available with the radiotelephone. However, these different voice and data applications require different communications capabilities. As a result, these applications may provide a different performance as perceived by each user depending upon the application being used, the mobile device of the user, and the current bearer network for the device. This can be a problem when users share an application over the network, such as multi-user gaming, wherein one user may have an advantage in application response time over another user, for example. It would be beneficial for a network operator to know the condition or performance available for a particular application for each mobile device such that resources can be properly allocated depending upon the use application.

Current resource allocation mechanisms for applications on cellular networks are based on scheduling algorithms that are network-centric; they are based in resource schedulers that allocate resources to optimize network utilization. However, these mechanisms do not permit application and content providers to observe, modify and optimize the performance characteristics of their distributed applications on heterogeneous networks and heterogeneous devices which may span multiple technologies and networks from different operators (e.g. UMTS, GSM, GPRS/EDGE, IEEE 802.xx). In addition, these mechanisms do not address the changing of resource requests from the mobile or connecting an application level of performance (i.e. QoS) with device management.

What is needed is a technique for a network operator or application or content provider to know the condition or performance available for particular use application for a mobile device such that network resources can be properly allocated depending upon the use application.

SUMMARY OF THE INVENTION

The present invention introduces a new technique for a user and a network operator or application or content provider to know the conditions or performance available for different communication applications for the device and to allocate resources accordingly. In particular, the present invention addresses the changing of resource requests from the mobile and connects an application's level of performance (i.e. QoS) with device management. Specifically, an existing SyncML Device Management diagnostic link, as defined by Open Mobile Alliance (OMA) standards, can be used to provide the information needed for proper resource allocation, as will be defined below.

In one aspect of the present invention, a probe application exists or is downloaded to the communication device for monitoring a level of performance of a plurality of applications provided by the network for the communication device.

In another aspect of the present invention, the probe application in the communication device is programmed to provide the measured level of performance of a use application to the network.

In another aspect of the present invention, the probe application determines service performance of communication applications, such as web browsing, downloading files, data streaming, VoIP, gaming, and the like.

In another aspect of the present invention, the network server collates the performance data and the performance data from a plurality of other communication devices and optimizes a level of performance of the use application for the communication devices in relation to the other communication devices.

In another aspect of the present invention, the probe application monitors application performance characteristics which includes at least one of the group of data throughput, bit error rate, page download time, number of re-tries, data delay, jitter, data latency, screen refresh rate, round trip time (RTT), and mouse click response time, and the like.

In another aspect of the present invention, wherein the level of performance includes a Quality of Service (QoS) determination for that particular use application, wherein the network optimizes performance by improving QoS class characteristics for the communication device.

In another aspect of the present invention, the network optimizes performance by changing a coding scheme allocation for the communication device.

In another aspect of the present invention, the network optimizes performance by averaging a level of performance of a particular use application for a plurality of communication devices and improves a level of performance for those communication devices with a below average level of performance for that particular use application.

In another aspect of the present invention, the network server transmits at least one optimization parameter back to the communication device, wherein the probe application modifies resource allocation requests form the communication device to the network server in accordance with the at least one optimization parameter.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, wherein:

DETAILED DESCRIPTION OF THE PREFERRED EMBODIMENT

The present invention introduces a new technique for a user and a network operator to know the conditions or performance available for different communication applications for the device and to allocate resources accordingly. In particular, the present invention addresses the changing of resource requests from the mobile and connects an application's level of performance (i.e. QoS) with device management. Specifically, an existing SyncML Device Management diagnostic, as defined by Open Mobile Alliance (OMA) standards, can be used to provide the information needed for proper resource allocation, as will be defined below.

Although the present invention is applied to a mobile radio-telephone device in the examples herein, it should be recognized that the present invention can also find application equally well in other types of communication devices such a computers, personal digital assistants (PDA), two-way radios, and the like.

In operation, the present invention monitors a use application's performance using a probe application (applet) downloaded into the terminal devices using the OMA-DM standards or similar protocols. The probe application will gather application performance characteristics such as throughput, latency, jitter, page download time, bit error rate (BER), screen-refresh rates, round trip time (RTT), mouse-click response speed, and the like, as required by the application/content provider. The applet will optionally buffer this information or transmit in real-time to a central application server which can collate information from one or more mobiles running the target application (for example in the case of multi-user games). Based upon policies defined by the content provider (for example observed slowest throughput link) the application performance targets can be optimized to provide the best possible end-user experience. This information is then sent back to the probe applet which can modify resource allocation requests at the mobile (for example changing coding scheme allocation or QoS class characteristics). Resource allocation may incorporate real conditions and constraints on the network as well.

Figure 1:
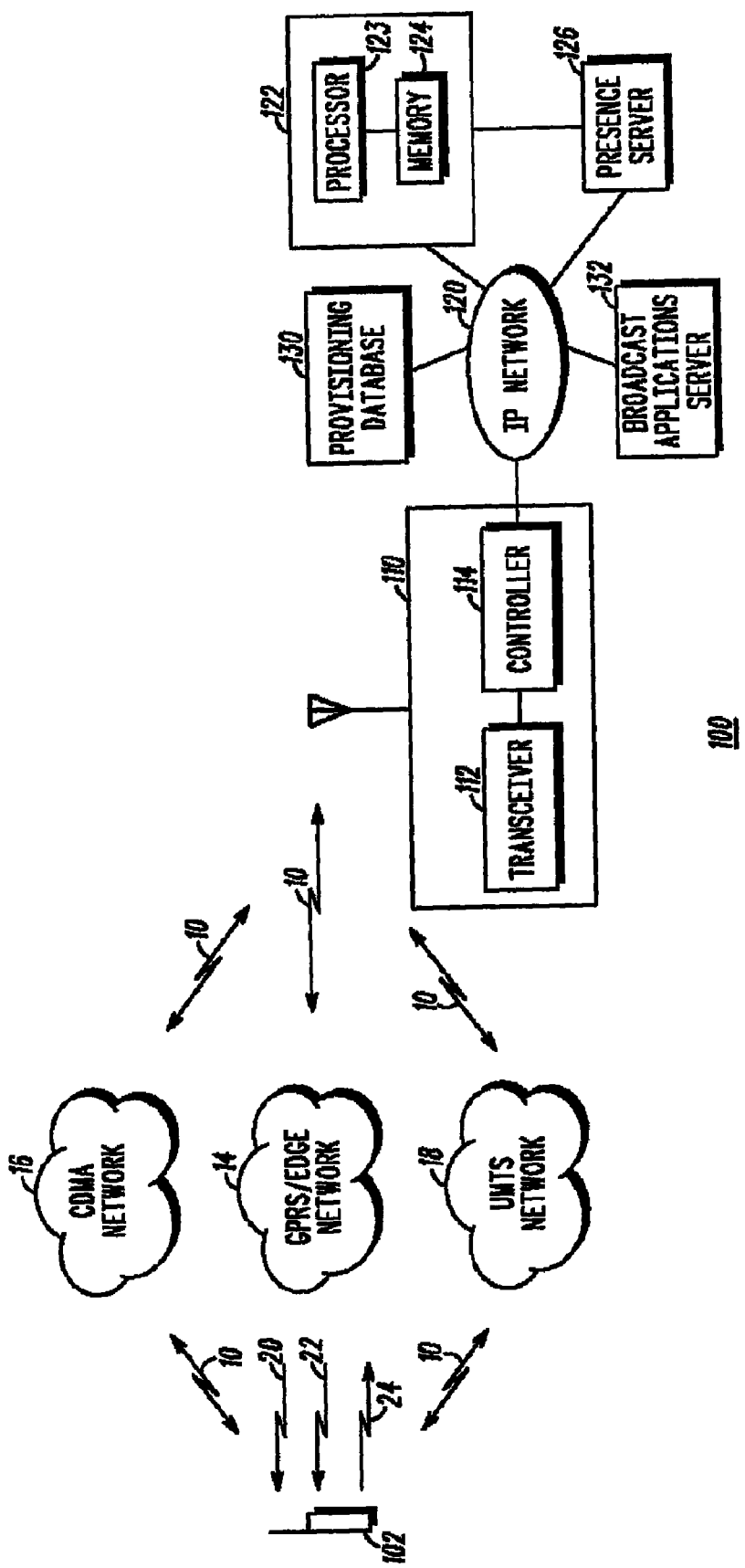
FIG. 1 shows a communication network and a communication device, in accordance with the present invention.

FIG. 1 is a block diagram of a wireless communication system 100 in accordance with an embodiment of the present invention. Communication system 100 includes at least one access network 110 (one shown), such as a Base Station Subsystem (BSS), a Radio Access Network (RAN), or a Wireless Local Area Network (WLAN) Access Point (AP), that provides wireless communication services 10 to at least one mobile station (MS) 102 (one shown), residing in a coverage area of the access network, such as for example, a cell, a sector of a cell, or whatever is appropriate for the communication technology employed by communication system 100, serviced by the access network. Access network 110 includes a transceiver 112, for example, a Base Station Transceiver (BTS) or a Node B, coupled to a network controller 114, for example, a Base Station Controller (BSC) or a Radio Network Controller (RNC).

Access network 110 provides communications services to MS 102 via an air interface 10. Air interface 10 can include a forward link that includes at least one forward link traffic channel and at least one forward link signaling channel. Air interface 10 can further include a reverse link that includes at least one reverse link traffic channel, at least one reverse link signaling channel, and an access channel. For the purposes described herein, air interface 10 is generically applicable to different air interfaces operable in various communication systems such as a CDMA network 16, GPRS network 14, UMTS network 18, and the like, and it should be appreciated that different physical layer formats would be used with each type of network, as are known in the art.

Communication system 100 further includes a core network 120, preferably an Internet Protocol (IP)-based network, coupled to access network 110 and a network server 122, and more specifically a Device Management and System Optimization Server (DMSOS) 122, coupled to the core network. DMSOS 122 preferably comprises at least one processor 123, such as one or more microprocessors, microcontrollers, digital signal processors (DSPs), combinations thereof or such other devices known to those having ordinary skill in the art, and an associated at least one memory device 124 that maintains data and programs that may be executed by the corresponding processor.

Core network 120 is further coupled to a Presence Server 126 which is further coupled to DMSOS 122. Provisioning database 130 stores an MS identifier associated with each MS active in communication system 100, such as MS 102. Provisioning database 130 may be included in a Home Location Register (HLR) or a Visited Location Register (VLR), or a combination of an BLR and a VLR, or a Home Agent (HA) or a Foreign Agent (FA), or a combination of an HA and an FA, as known in the art. Communication system 100 may further include a broadcast application server 132, such as a Broadcast-Multicast Service (BCMCS) Controller and/or a BCMCS Content Server, or a Broadcast Multicast Service Center (BM-SC) and possibly other servers such as a User Support Server that is coupled to core network 120. Each of access network 110, DMSOS 122, Presence Server 126, Provisioning database 130, and broadcast application server 132 comprises a network element of communication system 100 and, together with core network 120, are collectively referred to herein as a infrastructure of communication system 100. One of ordinary skill in the art realizes that the infrastructure may further include other network elements, such as one or more gateways, for example, a Packet Data Serving Node (PDSN) and/or a Broadcast Serving Node (BSN), or a Serving GPRS Support Node (SGSN) and a Gateway GPRS Support Node (GGSN), and one or more Operations and Maintenance Centers (OMCs), that are not depicted in FIG. 1 as FIG. 1 is provided merely to illustrate the principles of the present invention and is not intended to be an exclusive depiction of communication system 100.

Figure 2:
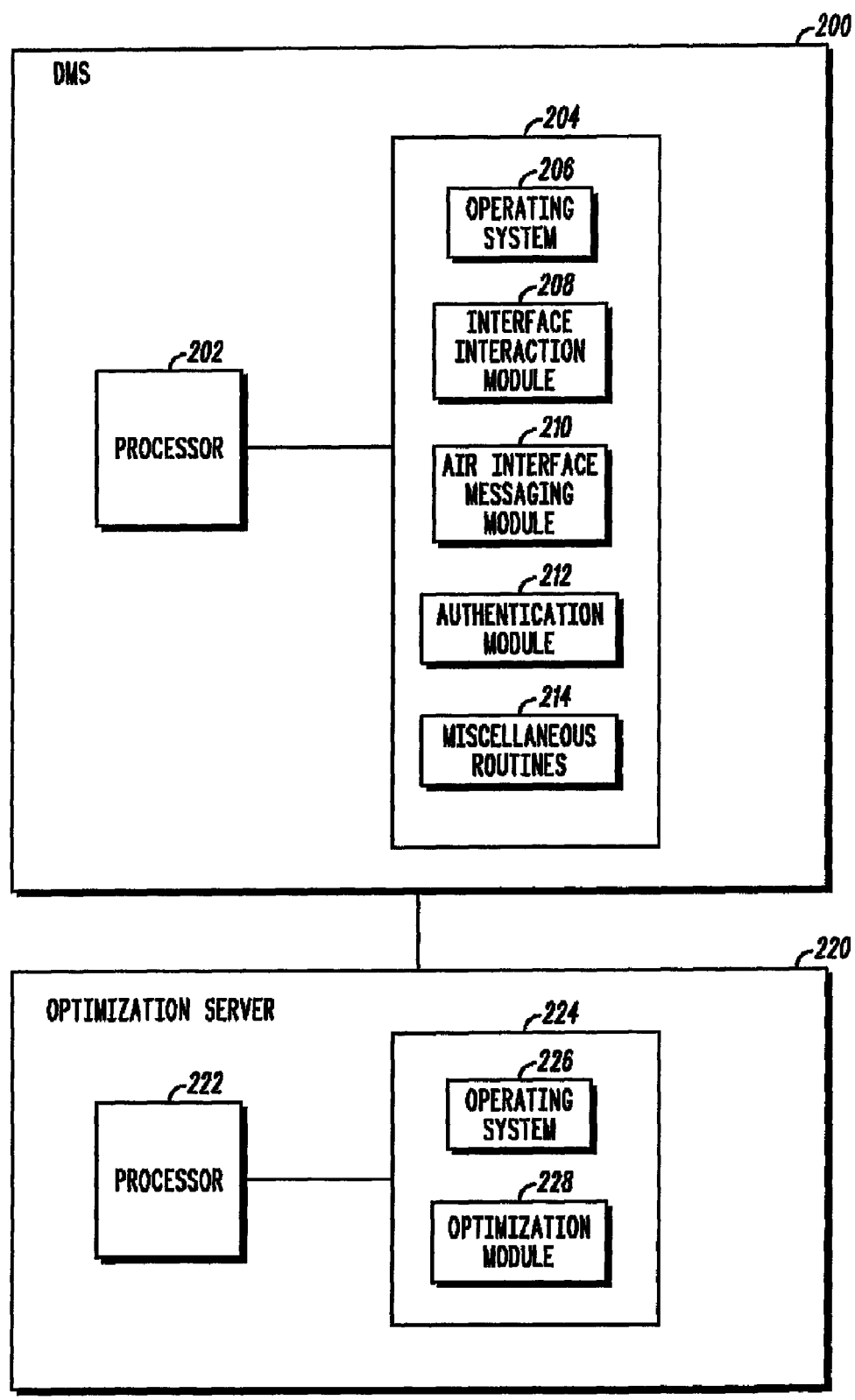
FIG. 2 shows a block diagram of an architecture of a Device Management and System Optimization Server of FIG. 1.
Figure 3:
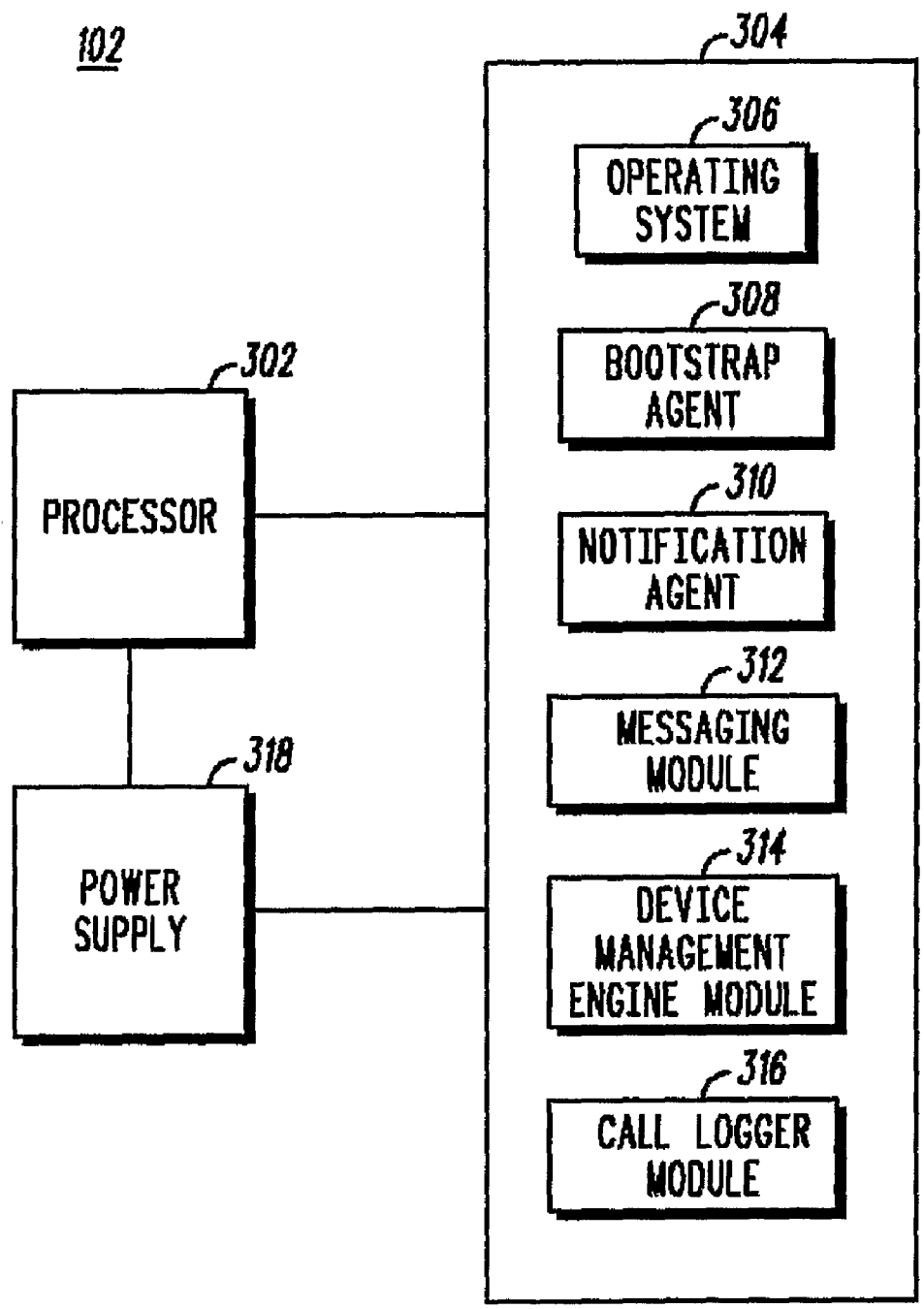
FIG. 3 is a block diagram of an architecture of a mobile station of FIG. 1 in accordance with an embodiment of the present invention.

Referring now to FIGS. 2 and 3, block diagrams are provided that respectively illustrate an architecture of DMSOS 122 and MS 102. In one embodiment of the invention, the functionality depicted in FIG. 2 may reside in a single server. In another embodiment of the invention, as depicted in FIG. 2, the functionality of DMSOS 122 may be distributed among multiple servers, such as DMS 200 and Optimization Server 220. As depicted in FIGS. 2 and 3, each of DMS 200, Optimization Server 220, and MS 102 includes a respective processor 202, 222, 302, such as one or more microprocessors, microcontrollers, digital signal processors (DSPs), combinations thereof or such other devices known to those having ordinary skill in the art. Unless otherwise specified herein, the functions performed by each of DMS 200, Optimization Server 220, and MS 102 are performed by the respective processor 202, 222, and 302 of the DMS, Optimization Server, and MS. The particular operations/functions of processors 202, 222, and 302, and respectively thus of DMS 200, Optimization Server 220, and MS 102, are determined by an execution of software instructions and routines that are maintained in a respective at least one memory device 204, 224, and 304 associated with the processor.

Referring now to FIG. 2, the software maintained in at least one memory device 204 of DMS 200 generally includes an operating system (OS) 206 comprising data and variables for providing overall control. Additionally, an Optimization Server interface or interaction module or routine 208 includes discovery and association functions and the like to support an ability to interface with Optimization Server 220 for exchanging messages according to a standard protocol for the developed features of a UMTS or CDMA-1X MS, including messaging related to monitoring performance related to a quality of an experience of a user of a client device, such as MS 102, and end-to-end network testing. Further included is an air interface messaging module or routine 210 that supports initiation and/or notification of system performance monitoring and testing via unicast or broadcast messages sent to client devices and other messaging in support of system performance monitoring and testing.

Still referring to FIG. 2, the software maintained in at least one memory device 224 of Optimization Server 220 also generally includes an operating system (OS) 226 comprising data and variables for providing overall control. In addition, the software includes optimization applications 228 that communicate with applications running on client devices serviced by the Optimization Server 220, such as MS 102. In order to establish communications with client devices such as MS 102, Optimization Server 220 builds a Transport Control Protocol (TCP)/Internet Protocol (IP) tunnel through data network 120 to access network 110, although other protocols can be used. Optimization Server 220 may instruct the client devices to execute applications that perform system monitoring and testing, such as monitoring and testing voice quality, data quality, latency, and throughput. The instructions may be conveyed to a random set of client devices or Optimization Server 220 may determine a targeted set of devices and convey the instructions to the target set.

Referring now to FIG. 3, the software maintained in at least one memory device 304 of MS 102 also generally includes an operating system (OS) 306 comprising data and variables for providing overall control. In addition, the software includes multiple modules or routines 308, 310, 312, 314, and 316. A Bootstrap agent 308 has the responsibility for exchanging required information with DMSOS 122 prior to any end-to-end performance testing and/or management session. A Notification agent 310 is responsible for notifications to server 122 to initiate performance monitoring and/or end-to-end testing sessions. A Messaging module 312 that performs protocol binding for typical MS management sessions over considered bearers stack, for example, HTTP over TCP/IP or WAP.

A DM engine module 314 includes a DMT Engine that performs the same function as in DMS 200 but extended for diagnostics case, a DM agent that performs the same function as in DMS 200 but extended for diagnostics case, an OMA-DM (Open Mobile Alliance-Device Management) agent that performs the same function as in DMS 200 but extended for diagnostics case, and a Policy agent that is responsible for respecting the policies dictated to the MS by DMSOS 122, such as a call logging model and a format and frequency of corresponding reports. A Call Logger 316 and a corresponding API (Application Program Interface) is an additional source for the DM Engine mechanism and facilitates a delivery of a corresponding report to a given call logging model and policy.

Communication system 100 may operate in accordance with any one of various standards such as CDMA (Code Division Multiple Access) and variants thereof, GSM (Global System for Mobile communications), GPRS (General Packet Radio System), GPRS/EDGE (GPRS Enhanced Data for GSM Evolution), TDMA (Time Division Multiple Access), FDMA (Frequency Division Multiple Access), any one of the IEEE (Institute of Electrical and Electronics Engineers) 802.xx standards, for example, the 802.11, 802.15, 802.16, or 802.20 standards, 3G systems such as UMTS (Universal Mobile Telecommunication Service) and CDMA 2000, or 4G systems such as OFDM (Orthogonal Frequency Division Multiple Access). By operating in accordance with well-known protocols, a user of MS 102 can be assured that MS 102 will be able to communicate with access network 110 and establish a packet data communication link with an external network via the access network.

When a user of MS 102 activates the MS, the MS registers with access network 110 on any chosen communication network, in accordance with well-known registration techniques. As part of the registration procedure, a presence of an activated MS 102 is detected and stored in Presence Server 126. Typically, when an MS, such as MS 102, is engaged in a call, the MS may then periodically monitor a strength of pilot channels associated with nearby BSSs or RANs and report the signal strength measurements back to a BSS or RAN serving the MS.

Such signal strength reports are not necessarily the system parameters that are most useful for optimization of application performance. In addition, a periodic measuring and reporting of signal strengths by an MS engaged in a call does not provide an accurate system for gauging an impact on a change in an access network configuration. Furthermore, typically the terminating network element for such signal strength reports is a BSS or RAN and the BSS or RAN are not the best network elements for optimizing application performance based on such reports.

Therefore, communication system 100 provides for a managing of MSs wherein the MSs may be selectively instructed to monitor, measure, and report application parameters, may be instructed which application parameters to measure and report, and may further be instructed as to the conditions under which to monitor, measure, and report the application parameters. In addition, communication system 100 provides for an end-to-end messaging via access network 110 and core network 120 with respect to the instructing and reporting, thereby permitting network elements that are best able to perform system optimization, such as DMSOS 122, to control the monitoring, measuring, and reporting by the MSs.

Referring back to FIG. 1, a network server 110, 120, 122 can provide voice and data communications 10, which can include downloading files streaming multimedia information, VoIP, real-time gaming, and the like, over the network 100 to one or more communication devices 102. A probe application 20 (applet) is provided by the DMS-OS server 122 (or other server) for use by a communication device 102 to report back a perceived level of performance of a network application. In practice, the probe application can be downloaded to a mobile radiotelephone on a policy basis using the Open Mobile Alliance (OMA) SyncML Device Management Protocol standards compliant format, for example. The client application can be downloaded once to the mobile 102 and stored in memory 304 or downloaded as needed as the mobile is powered up. The probe application controls the monitoring a level of performance of a use application (e.g. multi-user gaming, eBay™, etc.) running on the communication device, as will be detailed below.

The device 102 downloads the probe application 20 which is stored in memory 304 for use by the Device Management Module 314, which is used to subsequently monitor a level of performance of a plurality of communication use applications 10 provided by the network server through the network 100 for the communication device 102. An example of use applications can be specific applications for web browsing (e.g. eBay™), file downloading, data streaming, Voice Over Internet Protocol (VoIP), and real-time gaming. The probe application will gather application performance characteristics such as throughput, latency, jitter, bit error rate (BER), frame error rate (FER), page download times, screen refresh-rates, round trip times (RTT), mouse-click response speed, Quality of Service (QoS), and the like, as required by the application/content provider.

The probe application will optionally buffer this information for later transmission 24 or transmit 24 in real-time to a central application server (i.e. DMS-OS 122) which can collate information from one or more mobiles 102 running the target application (e.g. multi-user games). Based upon policies defined by the content provider (for example observed slowest throughput link) the application performance targets can be optimized to provide the best possible end-user experience. These optimization parameters 22 are then sent back to the probe applet which can modify resource allocation requests at the mobile (for example changing coding scheme allocation or QoS class characteristics), wherein the probe application modifies resource allocation requests from the communication device to the network server in accordance with at least one optimization parameter. Resource allocation requests can incorporate real conditions and constraints on the network as well. Although the transfer of the probe application 20, performance measurements 24, and optimization parameters 22 is shown through a GPRS network 14, it should be recognized that these data transfers can occur over one or more distributed technology network 16, 18, etc.

The present invention measures application performance as perceived by the user. As should be recognized, different applications may run differently on different networks. For example, a particular gaming application with a high graphic content may run much faster on a UMTS network than a GPRS network. Therefore, a user on a GPRS network playing another user on a UMTS network may be at a distinct timing disadvantage. The present invention provides optimization parameters to individual users to request a different distributed resource allocation (i.e. change to a UMTS bearer) in order to balance game play, for example.

Resource allocations are negotiated. For example, a user can obtain a higher QoS resource if the user is willing to pay an increased cost. If a service is too costly for a user, that user or the network service provider may opt to drop that user out of a game, for example. Optionally, resource allocations within a particular bearer can be modified. For example, in the GPRS/EDGE network a coding scheme allocation can be changed to improve throughput. GPRS/EDGE present incorporates four schemes with different forward error correction algorithms that can provide a different level of perceived performance by a user. Alternatively, QoS class characteristics can be changed to improve a particular application's performance on the network. Typically, QoS class characteristics can be modified to optimize voice, background, interactive, and streaming applications, as needed.

In practice, a user's level of performance in a particular application (e.g. gaming) for a particular characteristic (e.g. mouse-click response speed) can be compared to other user's levels of performance. The service provider optimizes perceived performance by averaging a level of performance of a particular use application among a selected plurality of communication devices and improves a level of performance for those communication devices with a below average level of performance for that particular use application and attribute. For example, if it is found that a particular device, is experiencing a below average level of performance, that device can be instructed to request a different resource allocation among a group of distributed resources.

The present invention has the advantage of providing the ability to provide real-time end-user application performance reporting such that resources can be allocated to improve an end-user's experience.

While the present invention has been particularly shown and described with reference to particular embodiments thereof, it will be understood by those skilled in the art that various changes may be made and equivalents substituted for elements thereof without departing from the broad scope of the invention. In addition, many modifications may be made to adapt a particular situation or material to the teachings of the invention without departing from the essential scope thereof. Therefore, it is intended that the invention not be limited to the particular embodiments disclosed herein, but that the invention will include all embodiments falling within the scope of the appended claims.

What is claimed is:

1. A system to optimize performance in a network for a user application on a mobile radio communication device, the system comprising:
   a network server;
   a probe application that is provided by the network server for downloading by a communication device, the probe application for monitoring a level of performance of a plurality of applications provided by the network for the communication device; and
   a communication device that downloads the probe application and subsequently monitors a level of performance of the use application provided by the network for the communication device, the communication device transmitting monitored level of performance data for the use application to the network server;
   wherein the network server collates the performance data and performance data from a plurality of other communication devices and optimizes a level of performance of the use application for the communication device;
   wherein the network optimizes performance by averaging a level of performance of a particular use application for a plurality of communication devices and improving a level of performance for those communication devices with a below average level of performance for that particular use application;
   wherein the network server transmits at least one optimization parameter back to the communication device, and wherein the probe application modifies resource allocation requests from the communication device to the network server in accordance with the at least one optimization parameter.

2. The system of claim 1 wherein the use application being monitored is at least one of the group consisting of web browsing, data downloading, data streaming, Voice Over Internet Protocol (VoIP), and real-time gaming.

3. The system of claim 1 wherein the probe application monitors application performance characteristics including at least one of the group consisting of data throughput, bit error rate, page download time, number of re-tries, data delay, jitter, data latency, screen refresh rate, round trip time, and mouse click response time.

4. The system of claim 1 wherein the level of performance includes a Quality of Service (QoS) determination for that particular use application.

5. The system of claim 4 wherein the network optimizes performance by improving QoS class characteristics for the communication device.

6. The system of claim 1 wherein the network optimizes performance by changing a coding scheme allocation for the communication device.

* * * * *